(12) United States Patent
Lambrecht et al.

(10) Patent No.: US 10,994,904 B2
(45) Date of Patent: *May 4, 2021

(54) BEVERAGE CONTAINER CAP FOR USE WITH BEVERAGE EXTRACTOR

(71) Applicant: Coravin, Inc., Burlington, MA (US)

(72) Inventors: Gregory Lambrecht, Natick, MA (US); Michael Rider, Lowell, MA (US); Otto DeRuntz, Dunstable, MA (US)

(73) Assignee: Coravin, Inc., Bedford, MA (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/531,437

(22) Filed: Aug. 5, 2019

(65) Prior Publication Data

US 2019/0352062 A1 Nov. 21, 2019

Related U.S. Application Data

(62) Division of application No. 15/497,394, filed on Apr. 26, 2017, now Pat. No. 10,399,751.

(Continued)

(51) Int. Cl.
*B65D 51/00* (2006.01)
*B65D 41/04* (2006.01)
(Continued)

(52) U.S. Cl.
CPC ....... *B65D 51/002* (2013.01); *B65D 41/0442* (2013.01); *B65D 51/005* (2013.01);
(Continued)

(58) Field of Classification Search
CPC .............. B65D 51/002; B65D 41/0414; B65D 81/245; A61M 39/26; A61M 39/045;
(Continued)

(56) References Cited

U.S. PATENT DOCUMENTS

| 579,619 A | 3/1897 | Watkins, Jr. |
| 4,499,148 A | 2/1985 | Goodale et al. |

(Continued)

FOREIGN PATENT DOCUMENTS

| CN | 1143492 A | 2/1997 |
| CN | 1252986 A | 5/2000 |

(Continued)

OTHER PUBLICATIONS

International Search Report and Written Opinion for International Application No. PCT/US2017/038429, dated Sep. 26, 2017, 14 pages.

(Continued)

*Primary Examiner* — Shawn M Braden
(74) *Attorney, Agent, or Firm* — Wolf, Greenfield & Sacks, P.C.

(57) ABSTRACT

A cap for engagement with a beverage container allows an extractor needle or other conduit to pass through a portion of the cap such that beverage can be removed from the container without removing the cap. The cap may include a septum that is radially and/or axially compressed and a barrier layer arranged to engage with the container to form a seal.

19 Claims, 5 Drawing Sheets

Related U.S. Application Data (60) Provisional application No. 62/352,616, filed on Jun. 21, 2016.

(51) Int. Cl.
    *B65D 51/24*         (2006.01)
    *B67D 1/00*         (2006.01)
    *B67D 1/04*         (2006.01)
    *G06K 19/07*         (2006.01)

(52) U.S. Cl.
    CPC ......... *B65D 51/245* (2013.01); *B67D 1/0004* (2013.01); *B67D 1/0412* (2013.01); *G06K 19/0723* (2013.01); *B65D 2203/06* (2013.01); *B65D 2203/10* (2013.01); *B67D 2001/0092* (2013.01); *B67D 2001/0481* (2013.01); *B67D 2001/0487* (2013.01)

(58) Field of Classification Search
    CPC .............. A61M 2039/267; A61J 1/1406; A61J 1/2096; B01L 2300/044; B29C 66/342
    See application file for complete search history.

(56) References Cited

U.S. PATENT DOCUMENTS

| | | |
|---|---|---|
| 5,433,716 A | 7/1995 | Leopardi et al. |
| 5,853,094 A | 12/1998 | Tanaka et al. |
| 6,607,685 B2 | 8/2003 | Naritomi et al. |
| 7,032,631 B2 * | 4/2006 | Py ............................. B65B 7/161 141/82 |
| 7,186,241 B2 * | 3/2007 | Py ........................... A61J 1/2093 604/203 |
| 7,691,332 B2 | 4/2010 | Kacian et al. |
| 9,549,874 B2 | 1/2017 | Py |
| 10,399,751 B2 | 9/2019 | Lambrecht et al. |
| 2002/0029022 A1 | 3/2002 | Naritomi et al. |
| 2002/0193752 A1 | 12/2002 | Lynn |
| 2009/0098567 A1 | 4/2009 | Kacian et al. |
| 2009/0107948 A1 | 4/2009 | Brand et al. |
| 2009/0306620 A1 | 12/2009 | Thilly et al. |
| 2012/0103462 A1 | 5/2012 | Levy |
| 2013/0240530 A1 | 9/2013 | Glaser et al. |
| 2014/0246396 A1 * | 9/2014 | Jepson .................... G06F 16/00 215/260 |
| 2017/0361999 A1 | 12/2017 | Lambrecht et al. |

FOREIGN PATENT DOCUMENTS

| | | |
|---|---|---|
| CN | 101394825 A | 3/2009 |
| WO | WO 03/099671 A1 | 12/2003 |

OTHER PUBLICATIONS

First Office Action for Chinese Application No. 201780038815.0, dated Dec. 26, 2019.

\* cited by examiner

BEVERAGE CONTAINER CAP FOR USE WITH BEVERAGE EXTRACTOR

CROSS REFERENCE TO RELATED APPLICATION

This application is a division of U.S. application Ser. No. 15/497,394 filed Apr. 26, 2017, which claims the benefit of U.S. Provisional Application No. 62/352,616 filed Jun. 21, 2016, each of which is hereby incorporated by reference in its entirety.

BACKGROUND OF INVENTION

This invention relates generally to the dispensing or other extraction of fluids from within a container, e.g., in the dispensing of wine from a wine bottle.

SUMMARY OF INVENTION

One or more embodiments in accordance with aspects of the invention allow a user to withdraw or otherwise extract a beverage, such as wine, from within a bottle that is sealed by a specially arranged cap without removing the cap from the bottle. In some cases, removal of liquid from such a bottle may be performed one or more times, yet the cap may remain in place during and after each beverage extraction to maintain a seal for the bottle. Thus, the beverage may be dispensed from the bottle multiple times and stored for extended periods between each extraction with little or no effect on beverage quality. In some embodiments, little or no gas, such as air, which is reactive with the beverage may be introduced into the bottle either during or after extraction of beverage from within the bottle. Thus, in some embodiments, a user may withdraw wine from a wine bottle without removal of, or damage to, the cap, and without allowing air or other potentially damaging gasses or liquids entry into the bottle.

In one aspect of the invention, a cap is provided that can be engaged with a container to both close a container opening and provide the ability to extract beverage from the container by passing a needle or other conduit through the cap. For example, some wine bottles are closed by a screw cap made of aluminum or other metal that cannot be pierced by a needle used to extract wine from the bottle. Such a screw cap may be removed from the bottle and replaced with a cap that incorporates aspects of the invention, e.g., allows wine extraction without removal of the cap by passing a needle through the replacement cap. In some embodiments, the cap may also be arranged to reseal upon removal of the needle or other conduit from the cap, e.g., so that leakage of beverage from the container and/or leakage of air into the container is prevented after a needle passed through the cap is removed. Although sometimes referred to as a replacement cap herein, caps in accordance with inventive embodiments may be engaged with a container to seal the container closed at the time of initial bottling of the beverage.

In one embodiment, a cap includes a body having a lower cavity defined by a sidewall with a thread arranged at an inner side of the sidewall to engage with a threaded neck of a container. That is, the cap may be arranged to be screwed onto the threads of a container neck, such as those included with wine bottles that have a standard screw cap. In other embodiments, the replacement cap may engage with an exterior or interior of a container neck in other ways, such as by a friction fit. The cap may also have an upper cavity in which a septum is located. The septum may be compressed in radial and/or axial directions in the upper cavity. A barrier material, such as a laminate material including a polystyrene layer, a PET layer, and a PVDC layer or other set of materials, may be located between upper and lower openings of the body and arranged to engage with the container opening to seal the opening closed. For example, if the cap is threadedly engaged with a container, the barrier material may contact a top surface of the container around the container opening so as to seal the opening in much the same way that a screw cap seals the opening of a bottle closed. In other embodiments, a lower portion of the cap body may be inserted into a container opening, e.g., in a way similar to a bottle stopper, rather than have the cap threadedly engage the container neck. The septum may be provided in the upper cavity of the body and positioned over the barrier material. The septum may be arranged so the barrier material is out of contact with the septum, or the barrier material and septum may be in contact. The septum may include a block of silicone rubber or otherwise be arranged so that a needle can be passed through the septum. The septum may have an exposed upper surface and be compressed by the body in radial and/or axial directions, e.g., to aid the septum in resealing after penetration by a needle having a diameter of 16 gauge or less. That is, the septum may be arranged to reseal upon the withdrawal of a needle that passes entirely through the septum and the barrier layer so that a distal end of the needle is positioned inside of a container to which the cap is engaged.

In one embodiment, the body includes the sidewall and an annular ring extending inwardly from the sidewall between the barrier layer and the septum. For example, the barrier layer may be positioned on a bottom surface of the annular ring such that the barrier layer can be sandwiched between the annular ring and the top of a container neck to which the cap is secured. This may help the barrier layer form a seal with the container neck. In some embodiments, the body includes an inner sidewall that extends upwardly from annular ring and contacts the septum. For example, the inner sidewall may define the upper cavity in which the septum is positioned, and the inner sidewall may radially compress the septum. In some cases, a cover having an annular shape may engage the body at the upper opening, and may have an opening at which an upper surface of the septum is exposed. In some embodiments, the septum may be arranged in the body to be positioned outside of a container neck with the cap engaged with the container neck. Alternately, the septum may be at least partially positioned within the container neck with the cap engaged with the neck. While in some embodiments the upper cavity may be positioned entirely above the lower cavity, in some cases at least a portion of the upper cavity may be positioned within the lower cavity and/or at least a portion of the lower cavity may be positioned around the upper cavity.

Various exemplary embodiments of the device are further depicted and described below.

BRIEF DESCRIPTION OF THE DRAWINGS

Aspects of the invention are described with reference to various embodiments, and to the figures, which include.

DETAILED DESCRIPTION

Aspects of the invention are described below with reference to illustrative embodiments, but it should be understood that aspects of the invention are not to be construed narrowly in view of the specific embodiments described. Thus, aspects of the invention are not limited to the embodiments described herein. It should also be understood that various features in different embodiments may be used alone and/or in any suitable combination with each other, and thus various embodiments should not be interpreted as requiring any particular combination or combinations of features. Instead, one or more features of the embodiments described may be combined with any other suitable features of other embodiments.

Figure 1:
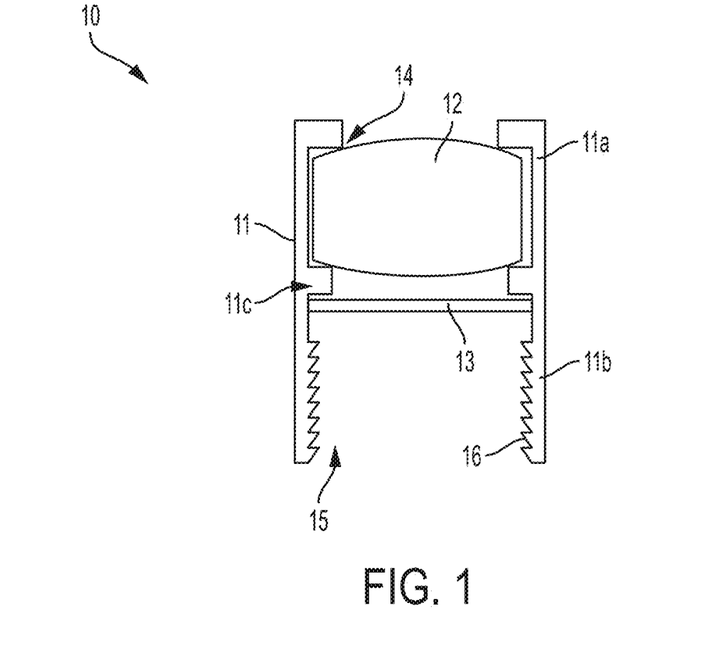
FIG. 1 shows a cross sectional view of a cap in an illustrative embodiment arranged to threadedly engage a container neck.

FIG. 1 shows a cross sectional view of a cap in an illustrative embodiment. The cap 10 of FIG. 1 includes a body 11, which may be made of a metal, plastic or other suitable material or combination of materials. Generally, the body 11 has a sidewall that may define a cylindrical shape and have an upper portion 11a and a lower portion 11b. The lower portion 11b of the sidewall may define a lower cavity 15, e.g., for receiving or otherwise engaging a neck of a beverage container. In this embodiment, the sidewall includes an internal thread 16 arranged to threadedly engage with a threaded neck of a container, e.g., like a screw cap. However, the body 11 may engage a container in other ways, such as by a friction fit (e.g., the lower cavity 11b may be sized to be approximately the same size or slightly smaller than a bottle neck so that the body 11 can be forced over the bottle neck), by an adhesive, by crimping, by a clamp, or other. Engagement of the body 11 with the container may, or may not be liquid- or air-tight. A barrier material 13 may be provided between upper and lower openings of the cap 10, and may be arranged to seal the container opening and/or otherwise provide a liquid- and/or air-barrier. In this embodiment, the barrier layer 13 is arranged to engage with the top surface of a container neck when the lower portion 11b is threadedly engaged to the neck and squeezes the barrier layer 13 into engagement with the lip of the container at the opening. The barrier layer 13 may include a circular sheet of laminate material, such as a laminate material including a polystyrene layer, a PET layer, and a PVDC layer. However, other arrangements for the barrier layer 13 are possible, such as a sheet of metal foil (e.g., aluminum), a polymer/foil laminate (e.g., like that used to close some food containers), a single layer of plastic material, etc.

The upper portion 11a may include a septum 12 located in the upper cavity 14 of the body 11. The septum 12 may be arranged to allow a needle or other conduit to pass through the septum 12 to access an interior of the container to which the cap 10 is engaged. That is, the body 11 includes upper and lower openings and defines a passageway from the upper to the lower opening, e.g., through which a needle or other conduit may pass. The septum 12 may include one or more passageways through which the needle or other conduit may pass, or may include no passageways or other openings through which the needle or other conduit may pass. Instead, the needle may form its own opening through the septum 12 as the needle is forced through the septum 12. In some embodiments, the septum 12 may be arranged to reseal upon withdrawal of a needle or other conduit from the septum 12, e.g., so that beverage in the container may be prevented from leaking out and/or so that air or other gas cannot pass through the septum 12 and into the container. In the embodiment of FIG. 1, the septum 12 includes a block of elastomeric material, such as a silicone rubber, and is compressed radially and/or axially to aid in resealing of the septum 12. That is, the inventors have found that compressing the septum 12 in one or two directions (e.g., orthogonal directions) may help the septum 12 reseal upon removal of a needle from the septum 12. To effect radial compression of the septum 12, the septum 12 may be made to have a diameter that is larger than the upper cavity 14 so that when the septum 12 is positioned in the upper cavity 14, the sidewall of the body 11 presses inwardly on the septum 12 from radial directions. To effect axial compression, an upper section of the sidewall may be bent or crimped over an upper side of the septum 12 so that the septum 12 is squeezed in a vertical direction, at least around a periphery of the septum 12, of the septum 12 may be made to have an axial dimension that is larger than the axial size of the upper cavity 14. In this embodiment, the bent or crimped upper section of the sidewall that captures an upper end of the septum 12 defines the upper opening of the body 10 through which a portion of the septum 12 may extend or bulge due to compression of the septum 12. Similarly, this embodiment includes an annular step or shelf 11c that supports a lower edge of the septum 12 and defines an opening at the body 11 interior through which the septum 12 may bulge. However, in other embodiments, the septum 12 may be completely contained at upper and lower sides, e.g., by a wall or other element that prevents bulging of the septum 12. The annular step, shelf or ring 11c may also support an upper side of the barrier layer 13, helping to press the barrier layer 13 to an top surface of a container when the cap 10 is engaged with the container. Thus, the barrier layer 13 may be sandwiched between the step or shelf 11c and the top surface of the container.

During use of the cap 10 with a beverage extractor (which is described in more detail below), a needle may be inserted through the septum 12 from an upper side or surface of the septum 12, through a bottom side or surface of the septum 12 and then through the barrier layer 13 so that the needle is passed into the opening of the container to which the cap 10 is engaged. This may allow pressurized gas to be injected into the container, as well as delivery of beverage from the container via the needle. Both the septum 12 and the barrier layer 13 may be arranged to reseal upon withdrawal of the needle, or only one of the septum 12 or barrier layer 13 may reseal, or neither may reseal with needle withdrawal.

Figure 2:
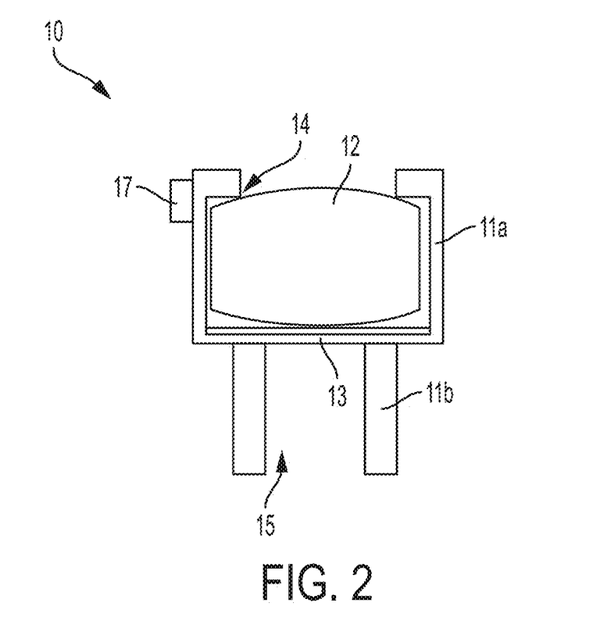
FIG. 2 shows a cross sectional view of a cap in an illustrative embodiment arranged to have a lower portion inserted into a container opening.

FIG. 2 shows another embodiment of a cap 10 that is similar to that in FIG. 1, except that a lower portion 11b of the body 11 is arranged to be inserted into an opening of a container, e.g., like a stopper or cork, as opposed to engaging around an outside of the container neck. The lower portion 11b may be made of any suitable size and/or shape, e.g., to engage the interior of a container opening by a friction fit, threaded engagement, etc. For example, the lower portion 11b may be formed of a metal or plastic that is covered at least in part by an elastomeric material to provide suitable engagement and liquid and air-tight seal with the container opening. A barrier layer 13 may be provided in an upper cavity 14 beneath the septum 12. In this embodiment, the barrier layer 13 is in contact with the septum 12, as opposed to the FIG. 1 embodiment where the barrier layer 13 is out of contact with the septum 12. Also, the septum 12 in this embodiment is arranged to be positioned outside of a container with the cap 10 engaged with the container, although other embodiments are possible where the septum 12 is at least partially positioned in the container as discussed below.

This embodiment also includes identification indicia 17 configured to uniquely identify the cap 10 from other caps, and thus possibly a container to which the cap 10 is engaged from other containers. The identification indicia may include an RFID tag, a barcode, alphanumeric text, a color code, a set of physical features (e.g., similar to Braille characters or other indicia), or any other suitable configuration to allow the cap 10 to be identified either by an automated reader and/or a user. The identification indicia 17 may be used in a variety of ways, such as to identify a particular container, identify a particular cap 10, to associate information with the cap 10 (e.g., a user may associate a particular bottle of wine with the cap 10 and track when the bottle was first accessed, how much wine remains in the bottle, how many times the bottle has been accessed, and so on). In case that the cap 10 is reused with a different container, a new set of information may be associated with the cap 10, including a new type of wine, information about the wine (such as vintage, winery, etc.), images of the wine being made, a winery logo, etc. information associated with the cap 10 via the identification indicia 17 may be presented to a user in various ways, such as displaying information on a reader of the indicia 17 (e.g., a smartphone equipped with a barcode reader may read barcode indicia 17 on the cap 10, and then display information related to the wine to the user on the smartphone).

Figure 3:
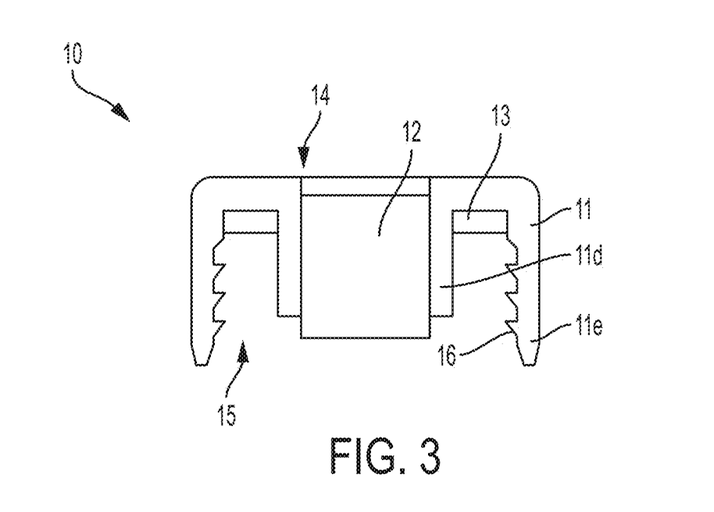
FIG. 3 shows a cross sectional view of a cap in another illustrative embodiment in which a portion of the septum is located within the lower cavity.

FIG. 3 shows another illustrative embodiment of a cap 10 that includes features like that in FIGS. 1 and 2. In this embodiment, the lower cavity 15 has an annular shape and is arranged to extend around at least a portion of the upper cavity 14 that receives a septum 12, e.g., so that the septum 12 and/or the upper cavity 14 is at least partially positioned in the lower cavity 15.

Figure 4:
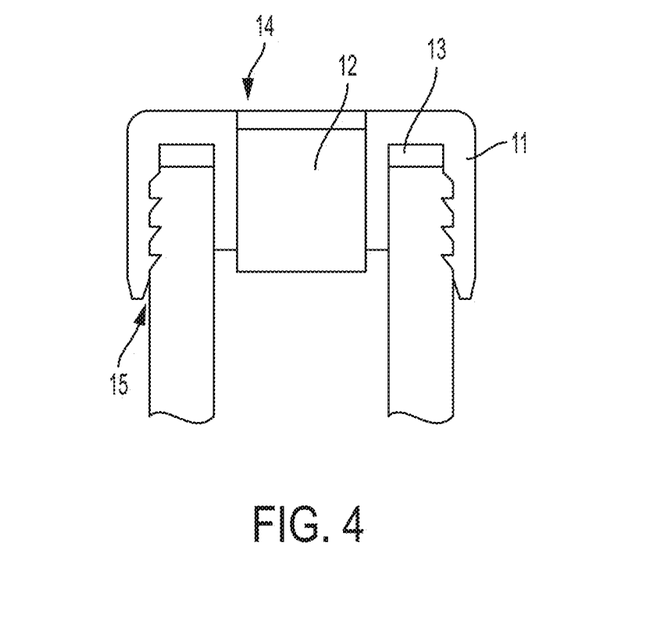
FIG. 4 shows the FIG. 3 embodiment engaged with a container.

Although in this embodiment the upper cavity 14 has a cylindrical shape without a shelf or step 11c or upper sidewall portion to compress the septum 12, such features may be used. Also, the inner sidewall 11d that defines the upper cavity 14 may include one or more barbs or other features on its inner surface to help hold the septum in place in the upper cavity 14. Thus, the septum 12 may be compressed in axial and/or radial directions in the upper cavity 14. The outer sidewall 11e of the body 11 may include a thread 16 on its inner surface to engage with a bottle top, e.g., as shown in FIG. 4, or may include other features, such as to engage a bottle by friction fit, interference, adhesive, etc. Also, the body 11 may have any suitable thread size or arrangement, and the lower cavity 15 may have any suitable diameter or other size to engage with a container neck. A barrier layer 13 may be provided in annular shape to engage the container top edge, e.g., when the body 11 is threaded onto the bottle neck, to establish a seal with the container. In some embodiments, the barrier layer 13 may have an inverted "top hat" type shape so that a "brim" of the "top hat" engages the bottle top edge like the annular element in FIG. 3, and the central portion of the "top hat" receives the inner sidewall 11d and septum 12. In this way, the barrier layer 13 may provide a continuous barrier across the opening of the bottle. In this embodiment, a needle of an extraction device may penetrate the portion of the barrier layer 13 positioned below the septum 12.

Figure 5:
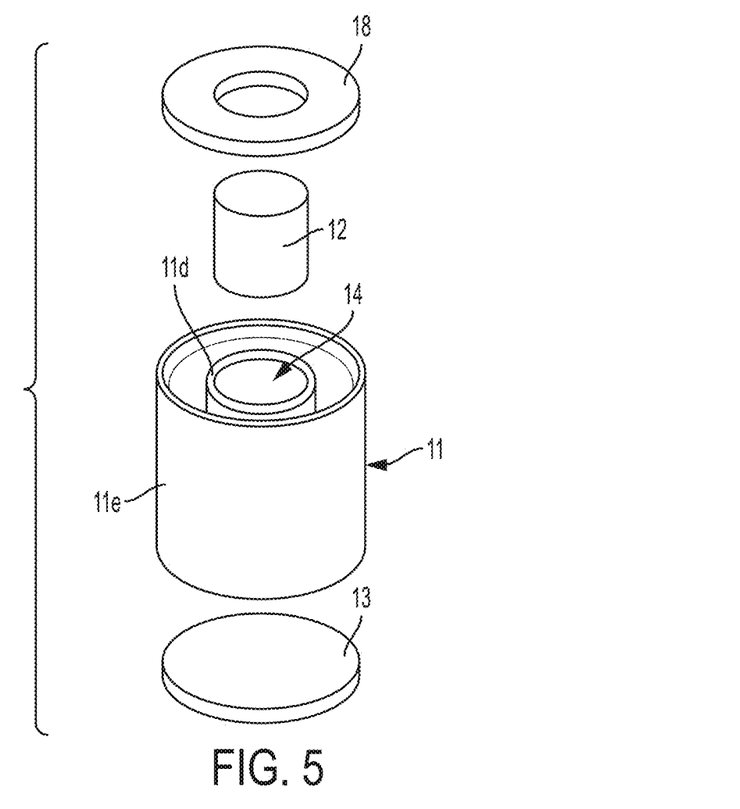
FIG. 5 shows an exploded view of a cap in another illustrative embodiment including an inner sidewall extending from an annular ring.
Figure 6:
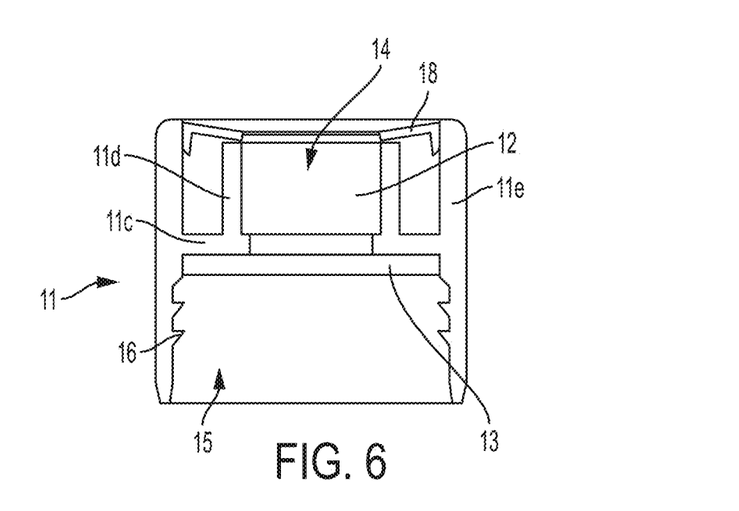
FIG. 6 shows a cross sectional view of the cap of FIG. 5.

FIGS. 5 and 6 show another illustrative embodiment of a cap 10. In this arrangement, the cap 10 includes an annular step or ring 11c that extends inwardly from the outer sidewall 11e of the cap 10. Similar to the FIG. 1 embodiment, a barrier layer 13 is positioned below the annular ring 11c, e.g., so that the ring 11c can press the barrier layer 13 into contact with a top surface of a container to which the cap 10 is engaged. In other arrangements, the barrier layer 13 may be positioned within an opening defined by the ring 11c or above the ring 11c. An inner sidewall 11d extends upwardly from the ring 11c and defines an upper cavity 14 in which a septum 12 is positioned. The inner sidewall 11d may be spaced radially inwardly from the outer sidewall 11e, e.g., to define an annular space between the inner and outer sidewalls. A cover 18 is positioned at an upper end of the cap 10, and engages with the outer sidewall 11e, e.g., with an interference fit by snapping a ring feature on the cover 18 into a corresponding groove at an inner surface of the outer sidewall 11e. The cover 18 includes an opening, e.g., that exposes an upper surface of the septum 14, although the cover 18 may obscure the septum 12 and be made piercable by a needle or other conduit, at least near a center area of the cover 18. In other embodiments, the inner sidewall 11d could extend downwardly from the cover 18, or from a portion of the body 11, such as where the cover 18 is made integrally with the outer sidewall 11e. As with other embodiments, the septum 12 may be compressed radially and/or axially by the inner sidewall 11d, the ring 11c and/or the cover 18. With the barrier layer 13 positioned below the ring 11c, the barrier layer 13 may be out of contact with the septum 12, although if positioned above the ring 11c or within an opening defined by the ring 11c, the barrier layer 13 may contact the septum 12.

Figure 7:
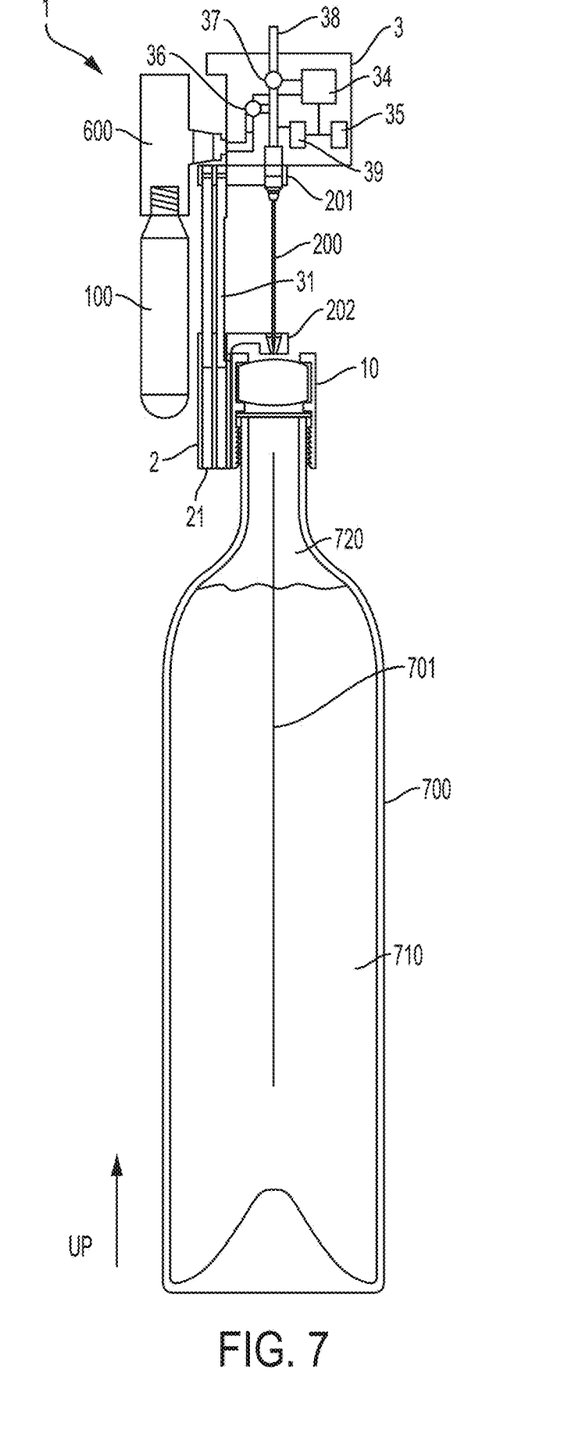
FIG. 7 shows a schematic view of a beverage extraction device in preparation for introducing a conduit through a closure of a beverage bottle.
Figure 8:
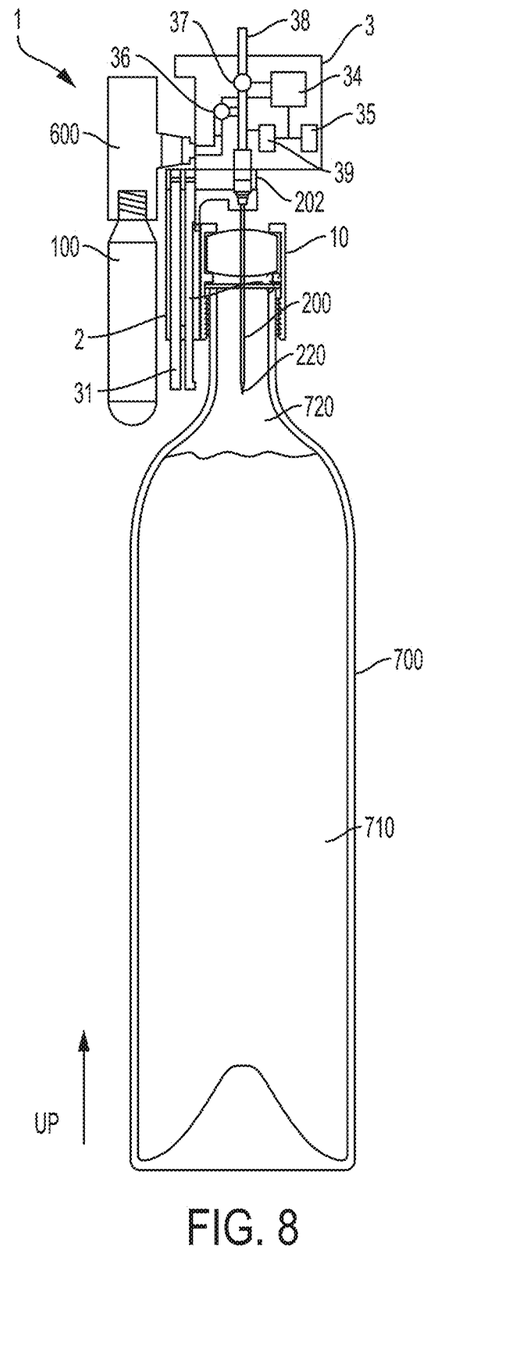
FIG. 8 shows the FIG. 1 embodiment with the conduit passed through the closure.

FIGS. 7 and 8 show schematic views of one embodiment of a beverage extraction device (or extractor) 1 used to extract beverage from a container that has a cap 10 like that in FIG. 1, 2 or 5/6 engaged with the container. Generally, the device 1 is used to insert a needle or other conduit through the cap 10 and into a beverage container 700, inject gas into the container 700 via the conduit, and dispense beverage forced out of the container 700 by the injected gas or other pressure in the container. This illustrative device 1 includes a body 3 with an attached source of pressurized gas 100 (such as a compressed gas cylinder) that provides gas under pressure (e.g., 2600 psi or less as dispensed from the cylinder) to a regulator 600. In this arrangement, the cylinder 100 is secured to the body 3 and regulator 600 by a threaded connection, although other configurations are possible, such as those described below and/or in U.S. Pat. Nos. 4,867,209; 5,020,395; and 5,163,909 which are hereby incorporated by reference with respect to their teachings regarding mechanisms for engaging a gas cylinder with a cylinder receiver. The regulator 600 is shown schematically and without detail, but can be any of a variety of commercially available or other single or multi-stage pressure regulators capable of regulating gas pressures to a pre-set or variable outlet pressure. The main function of the regulator 600 is to provide gas at a pressure and flow rate suitable for delivery to the container 700 (such as a wine bottle), e.g., so that a pressure established inside the container 700 does not exceed a desired level, e.g., 20-50 psi. In other embodiments, no pressure regulation of the gas released from the cylinder 100 need be done, and instead, unregulated gas pressure may be delivered to the container 700.

In this embodiment, the body 3 also includes at least one valve to control the flow of gas and/or a flow of beverage from the container 700. In this embodiment, a gas control valve 36 is provided to control the flow of gas from the gas source 100 to a conduit in fluid communication with the interior of the container 700, and a beverage control valve 37 to control the flow of beverage from the container 700 to a dispensing outlet 38. However, other arrangements are possible, e.g., a single valve may control the flow of both gas and beverage (e.g., using a three-way valve), a single valve may be used to control gas flow only (e.g., a beverage flow conduit may be always open from the container interior to the dispensing outlet and beverage may flow through the beverage flow conduit as gas is introduced into the container), or a single valve may be used to control beverage flow only (e.g., gas flow from the gas source 100 to the container 700 may be always open with the device 1 engaged with a container 700 and beverage flow may be controlled by opening/closing a beverage control valve only). One or both valves 36, 37 may be controlled by a controller 34, i.e., control circuitry. For example, the controller 34 may detect when the device 1 is engaged with a container 700, such as by detecting that the needle has been inserted through a septum 12 of a cap 10 or that a clamp of the device 1 is engaged with a container neck, and then control the valves accordingly. The valves may be manually operable by a user, and/or a user may provide input to the controller 34 to cause the valves to open and/or close. As another option, operation of the valves may be tied together, whether mechanically or via electronic control, e.g., so that when one valve is opened, the other valve is closed, and vice versa.

To introduce gas into the container 700 and extract beverage, at least one conduit is put in fluid communication with the interior of the container 700. In this embodiment, a needle 200 attached to the body 3 is inserted through the cap 10 that seals an opening at a neck of the container 700, as shown in FIG. 6. In this illustrative device 1, the needle 200 includes one or two lumens or conduits with a needle opening 220 along a sidewall of the needle near the needle tip. While the needle 200 may be inserted into and through the cap 10 in different ways, in this embodiment, the device 1 includes a base 2 with a pair of channels 21 that receive and guide movement of respective rails 31 of the body 3. Thus, movement of the body 3 and attached needle 200 relative to the cap 10 may be guided by the base 2, e.g., the body 3 may slide relative to the base 2 to move the needle 200 into/out of the cap 10. In addition, movement of the needle 200 may be guided by a needle guide 202 that is attached to the base 2 and positioned over the cap 10. To insert the needle 200 through the cap 10, a user may push downwardly on the body 3 while maintaining the base 2 and the container 700 at least somewhat stationary relative to each other. The needle 200 will pass through the cap 10, guided in its motion, at least in part, by the guided motion of the body 3 relative to the base 2 (e.g., by the rails 31 and channels 21). With the needle 200 suitably inserted as shown in FIG. 4, a needle opening 220 at the needle tip may be positioned below the cap 10 and within the enclosed space of the container 700. This allows fluid communication between the interior of the container 700 and one or more conduits of the needle 200.

Other arrangements for guiding movement of the body 3 relative to the base 2 are possible, such as providing one or more rails on the base 2 which engage with a channel or other receiver of the body 3, providing an elongated slot, channel or groove on the body or base which engages with a corresponding feature (e.g., a tab) on the other of the body or base and allows for sliding movement, a linkage that connects the body and base together and allows for movement of the body to insert the needle into the closure, and others.

In embodiments where a needle 200 includes one lumen or conduit, the valves 36, 37 may be controlled to alternately provide pressurized gas into the container 700 and allow beverage to flow from the container 700. For example, gas may first be introduced into the container 700 via the single conduit to establish a pressurized condition in the container 700, and then pressurized beverage may be permitted to flow out of the single conduit to the dispensing outlet. Where the needle 200 includes two lumens or conduits (or two or more needles are used), one or more conduits may be dedicated to gas flow into the container and one or more other conduits may be dedicated to beverage flow. Thus, the gas control valve 36 may control gas flow into the gas conduit(s), and the beverage control valve 37 may control beverage flow from the beverage conduit(s). Alternately, only one of the valves 36, 37 need be provided to control beverage flow, e.g., the gas control valve 36 may be opened/closed and beverage may flow out of the container and to the dispensing outlet 38 via a dedicated, always open beverage conduit depending on pressure in the container.

It has been found that needles having a smooth walled exterior, pencil point or Huber point needle of 16 gauge or higher are effective to penetrate through a cap 10, while sealing effectively with the cap to prevent the ingress or egress of gases or fluids during beverage extraction. Moreover, such needles allow the cap to reseal after withdrawal of the needle, allowing the bottle and any remaining beverage to be stored for months or years without abnormal alteration of the beverage flavor. Further, such needles may be used to penetrate a foil cover or other wrapping commonly found on wine bottles and other bottles. Thus, the needle may penetrate the foil cover or other element as well as the closure, eliminating any need to remove the foil or other wrapping prior to beverage extraction. Other needle profiles and gauges are also usable with the system.

While in the above embodiments the needle guide 202 and needle are positioned to have the needle penetrate the center of the cap 10, the lower opening or through hole of the guide 202 could be arranged to introduce the needle at a location offset from the center of cap 10. This may decrease the chances that a needle penetrates the cap 10 in a same location if the system 1 is used to dispense beverage from the bottle several times and may allow the cap 10 to better reseal upon needle withdrawal.

A needle used in a beverage extraction device may be a smooth exterior walled, cylindrical needle with a non-coring tip that can be passed through a cap without removing material from the septum or barrier layer. One non-coring tip is a pencil-tip that dilates a passageway through the septum, although deflected-tip and stylet needles have also been found to work properly and could be used in alternative embodiments. The pencil-tip needle preferably has at least one lumen extending along its length from at least one inlet on the end opposite the pencil-tip and at least one outlet proximal to the pencil-tip. As shown above, a needle outlet may be positioned in the side-wall of the needle at the distal end of the needle, although proximal of the extreme needle tip.

With the correct needle gauge, it has been found that a passageway (if any) that remains following removal of the needle from a septum self-seals against egress or ingress of fluids and/or gasses under normal storage conditions. Thus, a needle may be inserted through a cap septum to extract beverage, and then be removed, allowing the closure to reseal such that beverage and gas passage through the closure is prevented. While multiple needle gauges can work, preferred needle gauges range from 16 to 22 gauge, with an optimal needle gauge in some embodiments being between 17 and 20 gauge. These needles gauges may offer optimal fluid flow with minimal pressures inside the bottle while doing an acceptably low level of damage to the cap even after repeated insertions and extractions.

Multiple needle lengths can be adapted to work properly in various embodiments, but it has been found that a minimum needle length of about 1.5 inches is generally required to pass through standard wine bottle corks. Needles as long as 9 inches could be employed, but the optimal range of length for some embodiments has been found to be between 2 and 2.6 inches. (Needle length is the length of a needle that is operable to penetrate a closure and/or contact a needle guide for guidance in moving through the closure.) The needle may be fluidly connected to the valve directly through any standard fitting (e.g. NPT, RPT, Leur, quick-connect or standard thread) or alternatively may be connected to the valve through an intervening element such as a flexible or rigid tube. When two or more needles are used, the needle lengths may be the same or different and vary from 0.25 inches to 10 inches. Creating distance between the inlet/outlets of the needles can prevent the formation of bubbles.

In some embodiments, a suitable gas pressure is introduced into a bottle to extract beverage from the bottle. For example, with some wine bottles, it has been found that a maximum pressure of between around 40 and 50 psi may be introduced into the bottle without risking leakage at, or ejection of, the cap, although pressures of between around 15 and 30 psi have been found to work well. Thus, a cap 10 may be arranged to engage a container 700 so as to remain engaged with the presence of 10-50 psi in the container. These pressures are well tolerated by even the weakest of cap-to-bottle seals at the bottle opening without causing cap dislodging or passage of liquid or gas by the cap, and provide for relatively fast beverage extraction. The lower pressure limit in the bottle during wine extraction for some embodiments has been found to be between about 0 and 20 psi. That is, a pressure between about 0 and 20 psi has been found needed in a bottle to provide a suitably fast extraction of beverage from the bottle. In one example using a single 17 to 20 gauge needle, a pressure of 30 psi was used to establish an initial pressure in a wine bottle, and rapid wine extraction was experienced even as the internal pressure dropped to about 15-20 psi.

The source of pressurized gas can be any of a variety of regulated or unregulated pressurized gas bottles filled with any of a variety of non-reactive gasses. In a preferred embodiment, the gas cylinder contains gas at an initial pressure of about 2000-3000 psi. This pressure has been found to allow the use of a single relatively small compressed gas cylinder (e.g., about 3 inches in length and 0.75 inches in diameter) for the complete extraction of the contents of several bottles of wine. Multiple gasses have been tested successfully over extended storage periods, and preferably the gas used is non-reactive with the beverage within the bottle, such as wine, and can serve to protect the beverage oxidation or other damage. Suitable gases include nitrogen, carbon dioxide, argon, helium, neon and others. Mixtures of gas are also possible. For example, a mixture of argon and another lighter gas could blanket wine or other beverage in argon while the lighter gas could occupy volume within the bottle and perhaps reduce the overall cost of the gas.

In the embodiment above, a single needle with a single lumen is used to introduce gas into the bottle and extract beverage from the bottle. However, in other embodiments two or more needles may be used, e.g., one needle for gas delivery and one needle for beverage extraction. In such an embodiment, the valve(s) may operate to simultaneously open a flow of gas to the bottle and open a flow of beverage from the bottle. The needles may have the same or different diameters or the same or different length varying from 0.25 to 10 inches. For example, one needle delivering gas could be longer than another that extracts wine from the bottle. Alternately, a two lumen needle may be employed where gas travels in one lumen and beverage travels in the other. Each lumen could have a separate entrance and exit, and the exits could be spaced from each other within the bottle to prevent circulation of gas.

Control of the system may be performed by any suitable control circuitry of the controller 34, which may include a programmed general purpose computer and/or other data processing device along with suitable software or other operating instructions, one or more memories (including non-transient storage media that may store software and/or other operating instructions), a power supply for the control circuitry and/or other system components, temperature and liquid level sensors, pressure sensors, RFID interrogation devices or other machine readable indicia readers (such as those used to read and recognize alphanumeric text, barcodes, security inks, etc.), input/output interfaces (e.g., such as the user interface to display information to a user and/or receive input from a user), communication buses or other links, a display, switches, relays, triacs, motors, mechanical linkages and/or actuators, or other components necessary to perform desired input/output or other functions.

While aspects of the invention have been shown and described with reference to illustrative embodiments, it will be understood by those skilled in the art that various changes in form and details may be made therein without departing from the scope of the invention encompassed by the appended claims.

The invention claimed is:

1. A cap for engaging a container neck at a container opening, the cap comprising:
   a body having a lower cavity and an upper cavity that define a passageway from an upper opening to a lower opening of the body, the upper cavity defined by an inner sidewall and at least partially positioned in the lower cavity, the lower cavity defined by an outer sidewall with an inner side and configured to receive the container neck with a portion of the inner sidewall and upper cavity positioned inside the container opening;
   a barrier material arranged in the passageway between the upper and lower openings; and
   a septum in the upper cavity of the body, the septum having an upper surface at the upper opening and being compressed by the body in radial and/or axial directions, the septum being made to have a diameter that is larger than the upper cavity so that the body presses inwardly on the septum from radial directions when the septum is positioned in the upper cavity, the septum being arranged to be pierced by a needle extended from the upper opening toward the lower opening, the septum arranged to reseal after withdrawal of a needle that penetrates through the septum.

2. The cap of claim 1, wherein the septum includes a block of silicone rubber.

3. The cap of claim 1, wherein the body includes an annular ring extending inwardly from the outer sidewall to the inner sidewall.

4. The cap of claim 1, wherein the body is arranged to engage the container neck by friction fit.

5. The cap of claim 1, wherein the cap is arranged to prevent leakage of liquid or gas from the container with a pressure of 30 psi in the container.

6. The cap of claim 1, wherein the barrier layer is located below the septum.

7. A cap for engaging a container neck at a container opening, the cap comprising:
 a body having a lower cavity and an upper cavity that define a passageway from an upper opening to a lower opening of the body, the upper cavity defined by an inner sidewall and at least partially positioned in the lower cavity, the lower cavity defined by an outer sidewall with an inner side and configured to receive the container neck with a portion of the inner sidewall and upper cavity positioned inside the container opening;
 a barrier material located in the lower cavity and arranged in the passageway between the upper and lower openings; and
 a septum in the upper cavity of the body, the septum having an upper surface at the upper opening and being compressed by the body in radial and/or axial directions, the septum and the barrier material being arranged to be pierced by a needle extended from the upper opening toward the lower opening, the septum arranged to reseal after withdrawal of a needle that penetrates through the septum.

8. The cap of claim 1, wherein the septum is arranged to reseal after penetration by a needle having a diameter equal to 16 gauge or less.

9. A cap for engaging a container neck at a container opening, the cap comprising:
 a body having a lower cavity and an upper cavity that define a passageway from an upper opening to a lower opening of the body, the upper cavity defined by an inner sidewall and at least partially positioned in the lower cavity, the lower cavity defined by an outer sidewall with an inner side and configured to receive the container neck with a portion of the inner sidewall and upper cavity positioned inside the container opening;
 a barrier material arranged in the passageway between the upper and lower openings; and
 a septum in the upper cavity of the body, the septum having an upper surface at the upper opening and being compressed by the body in radial and/or axial directions, the septum being arranged to be pierced by a needle extended from the upper opening toward the lower opening, the septum arranged to reseal after withdrawal of a needle that penetrates through the septum, wherein a portion of the septum bulges into the upper opening due to compression of the septum.

10. The cap of claim 1, wherein the barrier layer is arranged to engage a top edge of a container neck to which the cap is attached.

11. The cap of claim 1, wherein the barrier layer includes a polystyrene layer, a PET layer, and a PVDC layer.

12. The cap of claim 1, wherein the inner side of the outer sidewall includes a thread to threadedly engage with a threaded neck of the container.

13. The cap of claim 1, wherein at least a portion of the lower cavity is positioned around the upper cavity.

14. The cap of claim 1, further comprising identification indicia configured to uniquely identify the cap from other caps.

15. The cap of claim 14, wherein the identification indicia includes an RFID tag.

16. The cap of claim 1, wherein the septum is positioned above the barrier material, and the barrier material is arranged to be pierced by the needle extended from the upper opening toward the lower opening.

17. The cap of claim 1, wherein the cap, including the septum and barrier material, is arranged to prevent leakage of liquid or gas from the container with a pressure of 20 psi in the container and the needle pierced through the septum, the needle having a gauge of 17 to 20.

18. The cap of claim 7, wherein the septum is compressed in the radial direction by the inner sidewall.

19. The cap of claim 7, wherein the barrier layer has an inverted top hat shape such that a portion of the barrier layer covers a lower portion of the septum and a brim portion of the barrier layer is arranged to engage with a top edge of the container around the container opening.

* * * * *